J. H. Wooster,
Water-Wheel-Gate Governor,
Nº 46,430. Patented Feb. 14, 1865.
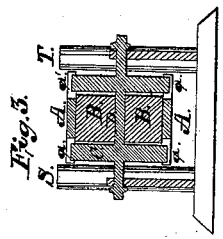
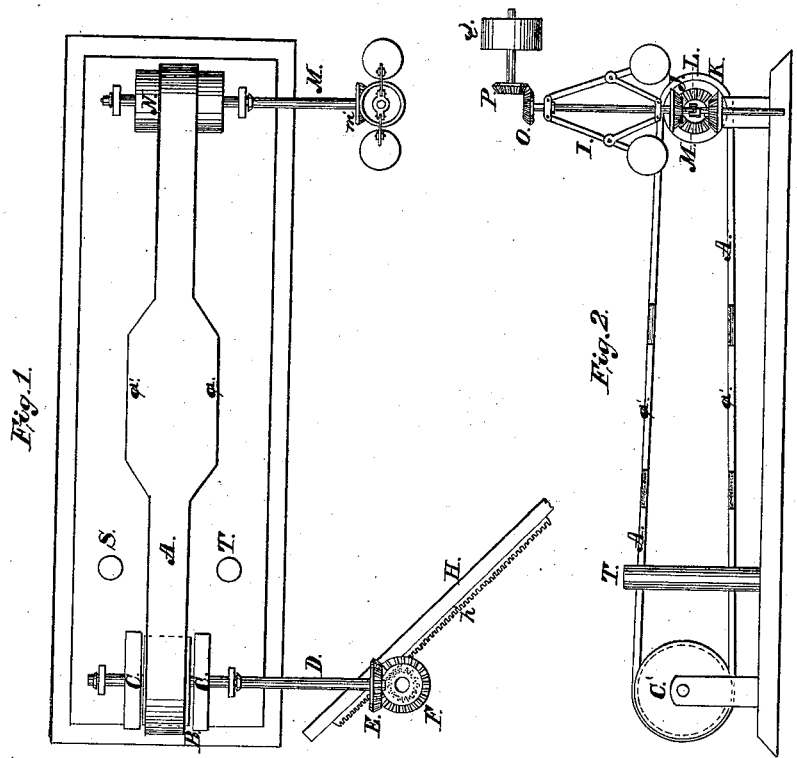
Attest:
B. H. Muehle
O. R. Forbush
Inventor:
Joab H. Wooster

UNITED STATES PATENT OFFICE.

JOAB H. WOOSTER, OF STRYKERSVILLE, ASSIGNOR TO HIMSELF AND ROBERT DUNBAR, OF BUFFALO, NEW YORK.

IMPROVEMENT IN GOVERNORS FOR WATER-WHEEL GATES.

Specification forming part of Letters Patent No. 46,430, dated February 14, 1865.

*To all whom it may concern:*

Be it known that I, JACOB H. WOOSTER, of Strykersville, in the county of Wyoming and State of New York, assignor to myself and ROBERT DUNBAR, of the city of Buffalo and State aforesaid, have invented a new and useful Improvement in Governors for Water-Wheel Gates; and I do hereby declare that the following is a full and exact description thereof, reference being had to the accompanying drawings, making a part of this specification, in which—

Figure I is a plan view. Fig. II is a side elevation, and Fig. III is a section.

The nature of this invention consists in the application and use of a belt of varying width, running over three pulleys located in close proximity to each other on one shaft, the middle pulley being loose on the shaft and the two outside being fast to the shaft, which shaft is, by means of rack and pinion or other suitable devices, connected with a water-wheel gate, in combination with a governor of ordinary construction, so that the governor will through this combination control the gate.

Letters of like name and kind refer to like parts in each of the figures.

A represents the belt which I use for this purpose. It is made wider at two or more parts thereof than at other parts, as shown at $a'$, the wide part thereof being made to act upon the outside fast pulleys and the narrow part to run on the middle or loose pulley. This belt may be made of rubber, leather, or other suitable material.

B represents a loose pulley over which the narrow part of the belt runs, and C C′ represent pulleys over which the wide part of the belt runs. The pulleys C C′ are made fast to the shaft D, and are a little larger in diameter than the loose pulley, so that the wide parts of the belt will have full bearing thereon and revolve the shaft as they pass over. The shaft D, to which these pulleys are connected, has a bevel-pinion, E, on the end thereof, which meshes with another bevel-pinion, F, on the vertical shaft $f'$, which latter shaft also has another pinion, $g$, which meshes with the rack $h'$, which rack is attached to the water-gate H.

I represents a governor of ordinary construction. Upon the shaft of this governor there is an arrangement of bevel-pinions J K and clutch L, for propelling the shaft M in either direction, as the speed of the governor may indicate. This shaft M has a pinion, $m'$, on the end thereof.

N is a fast pulley on the shaft M, over which the belt A passes.

O P Q are gear-wheels and pulley, which connect the governor to the main driving-shaft in a common manner.

S T are guide-pins for the belt.

Operation: When the main driving shaft is running at the proper speed, the clutch L will be midway between the pinions J K, and hence the shaft M will not be revolved in either direction. When running at too high a speed, the clutch L will engage the pinion J and cause the shaft M, and hence the belt, to revolve, and as the wide parts of the belt pass over the pulleys C C′ the shaft D will be revolved in the direction to close the gate and lessen the supply of water, and thereby slacken the motion. When the machinery is running too slow, the clutch will engage the pinion K, and cause the shaft M to revolve in a contrary direction, and hence, through the belt and mechanism before described, will cause the shaft D to revolve in a direction to open the gate and admit a greater supply of water, and thereby quicken the motion, and hence the governor has complete control over the gate, and a regularity in the working of the machinery is thereby obtained.

What I claim as my invention, and desire to secure by Letters Patent, is—

A belt of varying width, running over three pulleys located in close proximity to each other on one shaft the middle pulley being loose on the shaft, and the two outside being made fast on the shaft and which shaft is, by means of rack and pinion, or other suitable device, connected with a water-wheel gate and a governor of ordinary construction, so that the governor will control the movements of the gate to admit a greater or less quantity of water upon the wheel, substantially as described.

JOAB H. WOOSTER.

Witnesses:
GEO. W. WALLACE,
E. B. FORBUSH.